(12) United States Patent
Quantz et al.

(10) Patent No.: US 7,028,608 B1
(45) Date of Patent: Apr. 18, 2006

(54) HIGH PRODUCTION NUTCRACKING APPARATUS HAVING PROVISION FOR MAINTAINING THE NUTS IN CLEAN AND STERILE CONDITION

(75) Inventors: James B. Quantz, Lexington, SC (US); Pascal W. Pitts, Cayce, SC (US); John L. Feaster, Columbia, SC (US)

(73) Assignee: Machine Design Incorporated, West Columbia, SC (US)

( * ) Notice: Subject to any disclaimer, the term of this patent is extended or adjusted under 35 U.S.C. 154(b) by 0 days.

(21) Appl. No.: 11/145,586

(22) Filed: Jun. 6, 2005

(51) Int. Cl.
*A23N 5/00* (2006.01)
*A23N 5/02* (2006.01)

(52) U.S. Cl. .............................. 99/571; 99/574; 99/581

(58) Field of Classification Search ................. 99/568, 99/570, 571–576, 577–583; 426/481–482, 426/632, 634; 30/120.1; 198/622; 209/17, 209/156, 173
See application file for complete search history.

(56) References Cited

U.S. PATENT DOCUMENTS

| | | | | | |
|---|---|---|---|---|---|
| 928,958 | A | * | 7/1909 | Gilson | 99/569 |
| 1,160,376 | A | * | 11/1915 | Canale | 99/572 |
| 1,470,247 | A | * | 10/1923 | Hermann | 99/572 |
| 2,065,376 | A | * | 12/1936 | Kidd | 99/573 |
| 2,083,968 | A | * | 6/1937 | Walling | 99/573 |
| 2,209,606 | A | * | 7/1940 | Meyer | 99/572 |
| 2,288,191 | A | * | 6/1942 | Hayes | 99/572 |
| 2,549,881 | A | * | 4/1951 | Berg et al. | 99/579 |
| 3,561,513 | A | * | 2/1971 | Lindsey | 99/571 |
| 3,621,898 | A | * | 11/1971 | Turner | 99/571 |
| 3,628,580 | A | * | 12/1971 | Langston | 99/578 |
| 4,332,827 | A | | 6/1982 | Quantz | |
| 4,793,248 | A | * | 12/1988 | Frederiksen et al. | 99/575 |
| 5,247,879 | A | * | 9/1993 | Frederiksen et al. | 99/575 |
| 5,623,867 | A | | 4/1997 | Quantz | |
| 6,205,915 | B1 | | 3/2001 | Quantz | |
| 6,270,824 | B1 | | 8/2001 | Quantz | |
| 6,584,890 | B1 | | 7/2003 | Quantz et al. | |
| 6,588,328 | B1 | | 7/2003 | Quantz et al. | |
| 6,772,680 | B1 | | 8/2004 | Quantz et al. | |

\* cited by examiner

*Primary Examiner*—Timothy F. Simone
(74) *Attorney, Agent, or Firm*—Alston & Bird LLP

(57) ABSTRACT

A high production nutcracking apparatus wherein any whole nuts which are mis-fed or fail to be cracked, are automatically returned to the feed hopper without being exposed to possible contamination. To separate the shell fragments from the uncracked whole nuts, there is provided an inclined openwork grate, which is sized and configured to permit the shell fragments to pass directly therethrough while the whole nuts slide down and drop off a lower end of the grate. The grate is formed of a plurality of parallel rods which are supported so that they vibrate during operation of the cracking apparatus, to facilitate the sliding movement of the whole nuts.

20 Claims, 5 Drawing Sheets

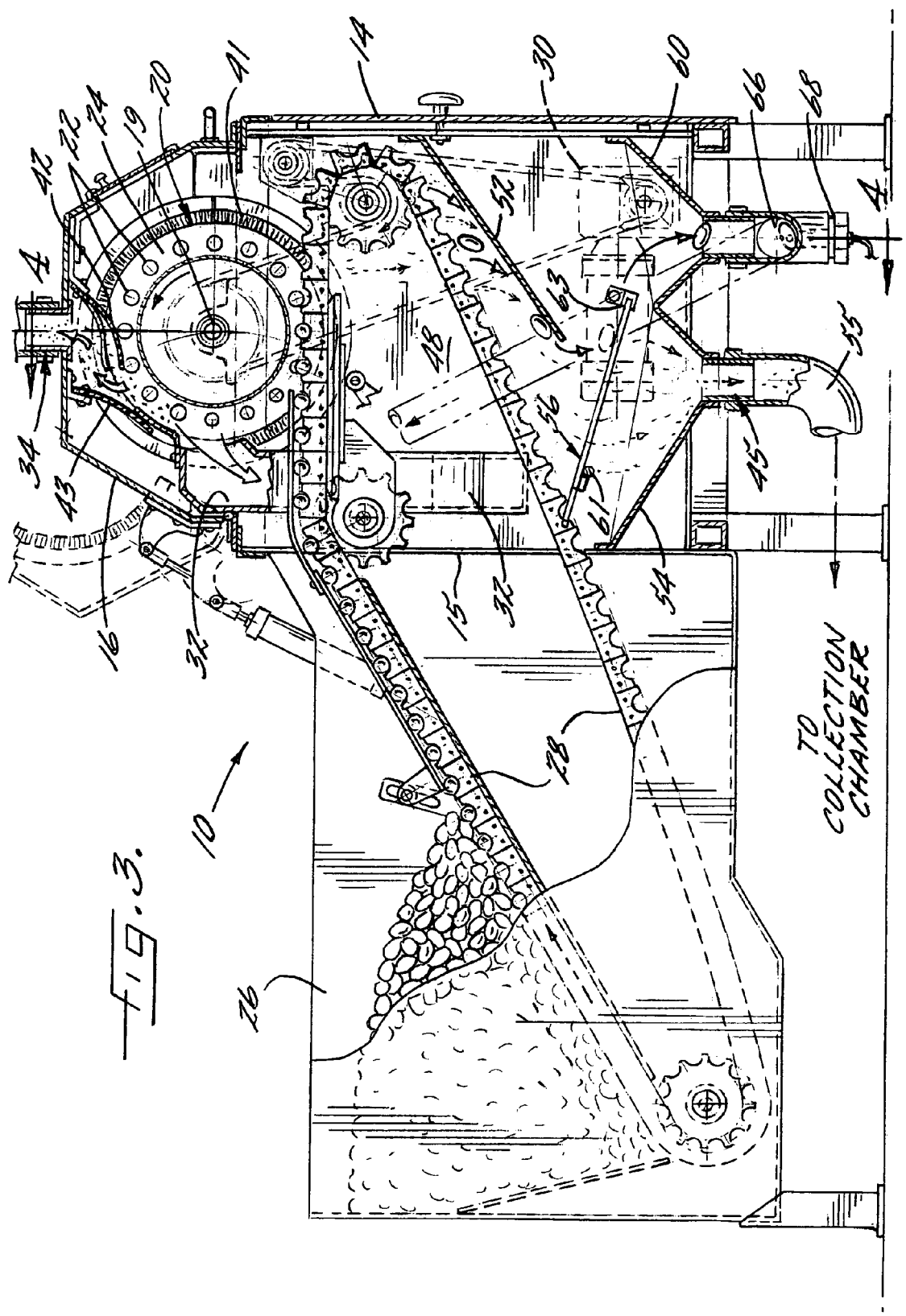

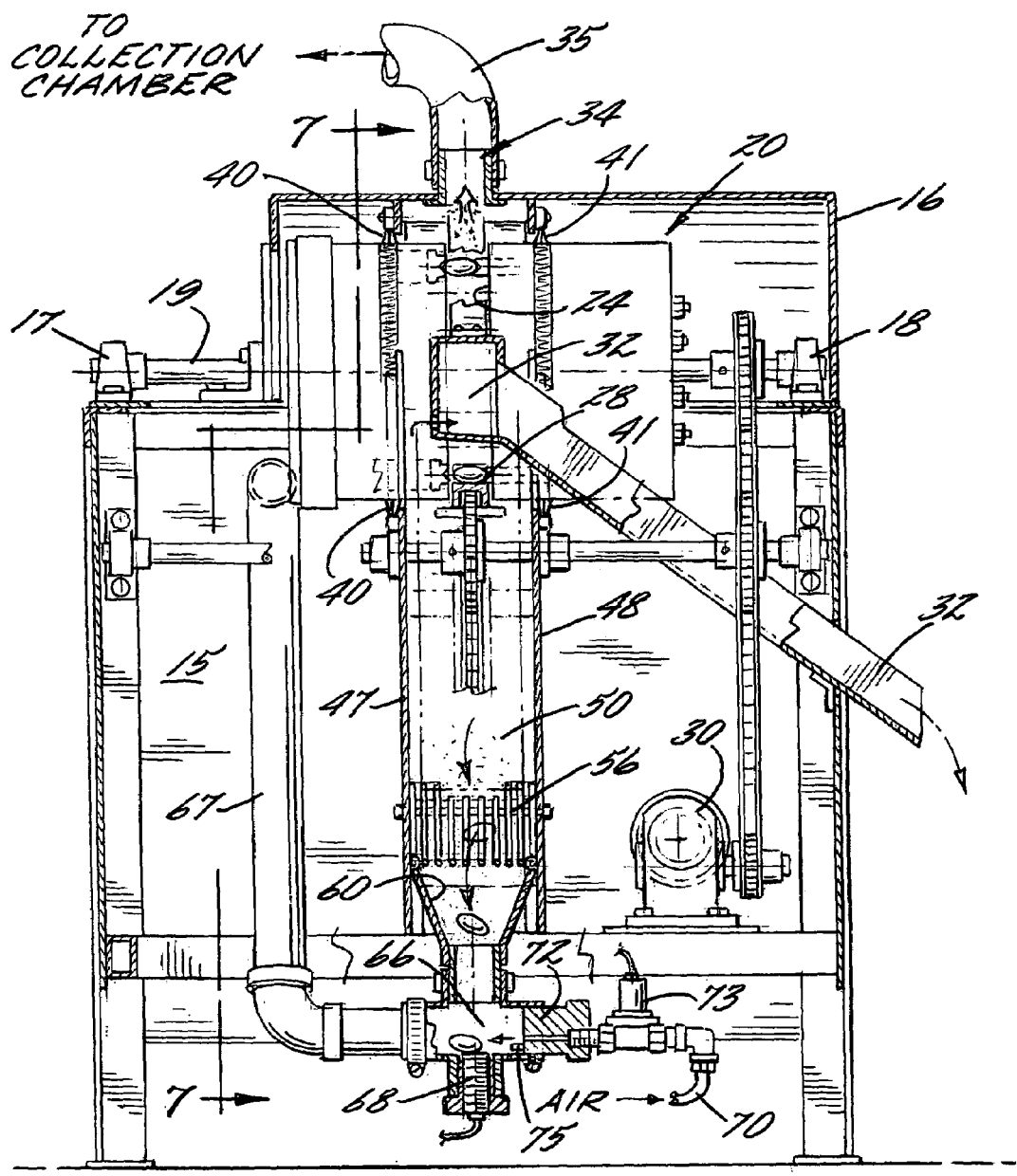
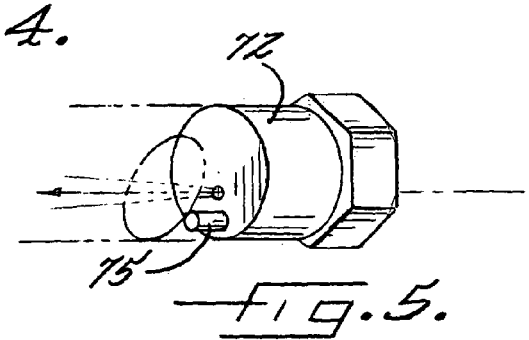

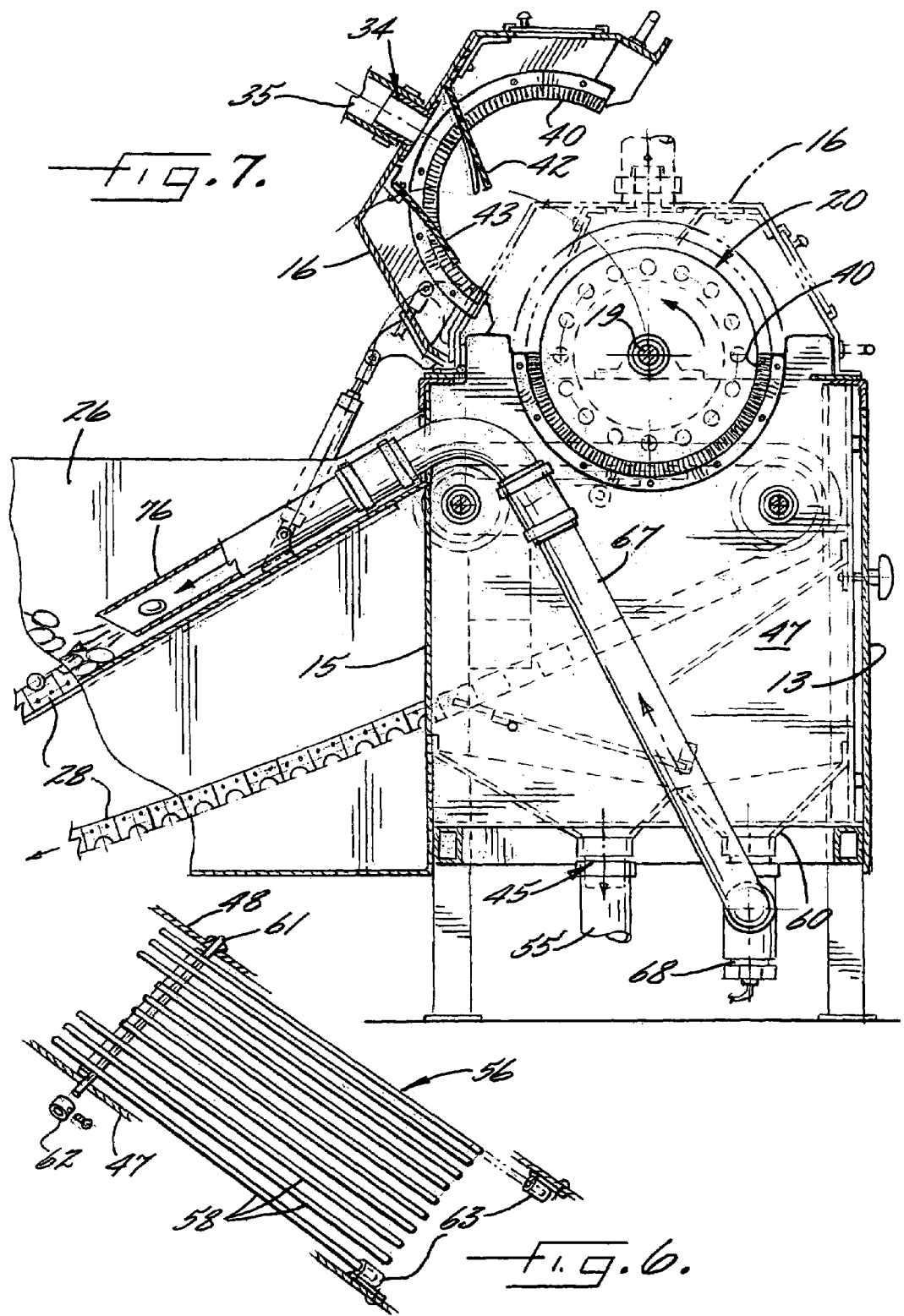

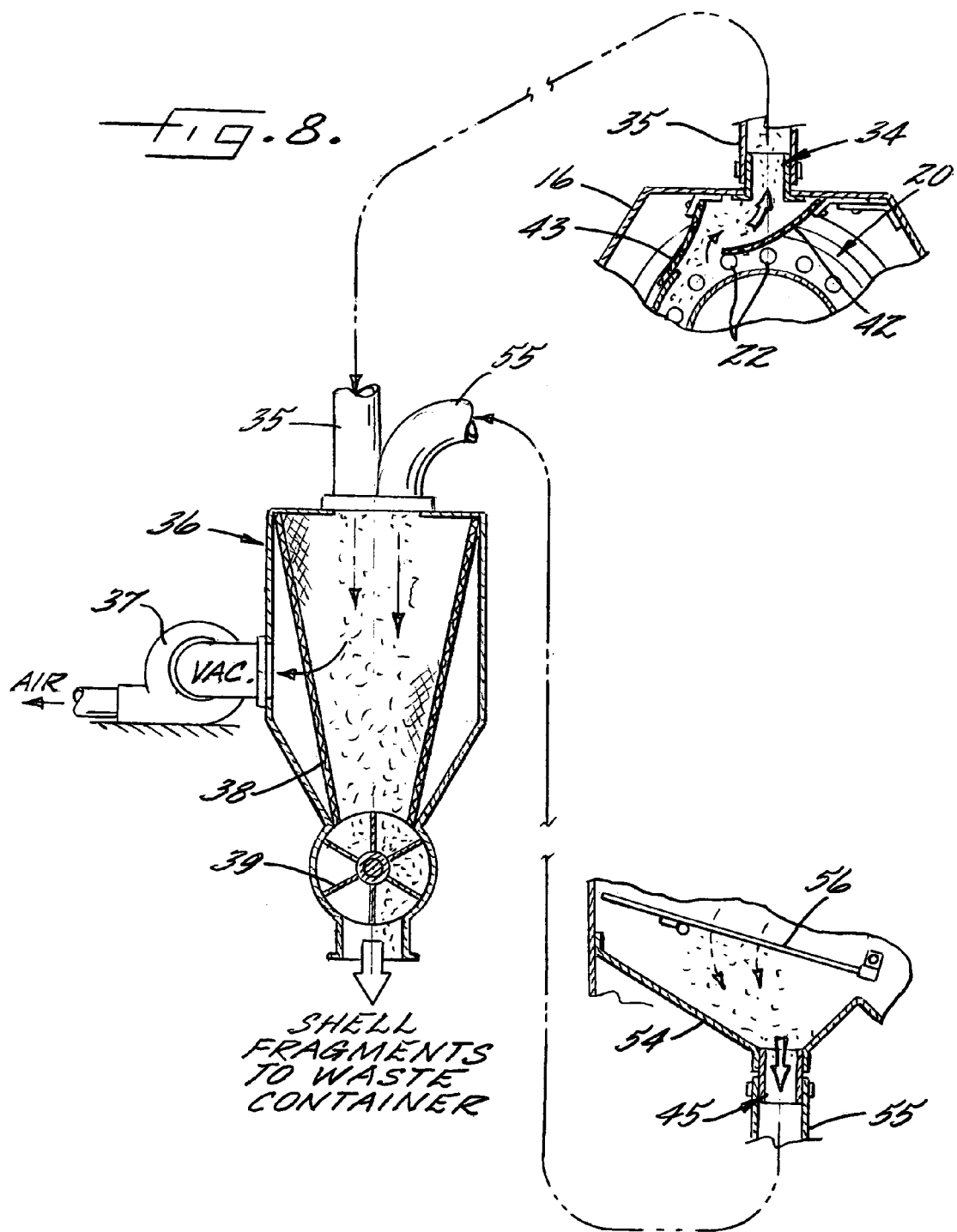

HIGH PRODUCTION NUTCRACKING APPARATUS HAVING PROVISION FOR MAINTAINING THE NUTS IN CLEAN AND STERILE CONDITION

BACKGROUND OF THE INVENTION

The present invention relates to a high speed nutcracking apparatus having provision for effectively separating shell fragments from uncracked whole nuts, and which serves to recycle the uncracked whole nuts back into the apparatus while maintaining the nuts in a clean and sterile condition.

U.S. Pat. Nos. 4,332,827; 5,623,867; 6,205,915; 6,270,824; 6,584,890, 6,588,328; and 6,772,680 all disclose a high speed nutcracking apparatus which includes a rotatable turret which mounts a plurality of cracking units arranged about is periphery, with each cracking unit having an opening adapted to receive an individual nut from a feed conveyor which comprises a plurality of nut transport elements mounted in succession on a feed chain. Each of the nut transport elements includes an upwardly open traverse receptacle for holding an individual nut, and each cracking unit on the turret has an anvil which is moved axially into the receptacle at a pick up point so that the nut is engaged between the anvil and a crack die on the other side of the opening.

In operation, the feed conveyor moves tangentially past the rotating turret so that the anvils of the cracking units enter the receptacles of respective nut transport elements at the pick up point and engage and pick up the nut. After the cracking unit and engaged nut have moved away from the pick up point and reach a cracking location, the crack die of the cracking unit is impacted by a shuttle so that the crack die applies an impact to the nut to crack the shell.

To facilitate the cracking operation, and to sanitize the nuts, the nuts are typically soaked in hot water prior to the cracking operation. However, maintenance of the sanitized conditions has not always been achieved, by reason of two factors. First is the fact that contamination of the nuts can occur through contact with the oil used in the lubrication system of the machine. This problem has been effectively alleviated by the sealed lubrication system described in U.S. Pat. No. 6,772,680.

The second factor which has contributed to the loss of sanitized conditions is the fact that the machine operators are often lax in assuring proper procedures are maintained during the operation of the machine. In particular, the machines will inherently mis-feed a small number of nuts prior to reaching the pick up point on the turret, and a few nuts will be dropped by the turret prior to being cracked, and these uncracked whole nuts fall to the ground, where they may come in contact with oil or other contaminants. The machine operators are instructed to return the nuts to the sanitizing water bath, but they will often simply shovel the contaminated nuts back into the feed hopper.

It is accordingly an object of the present invention to provide a nutcracking apparatus of the described type which is capable of separating the uncracked whole nuts from shell fragments generated during the cracking operation, and returning the separated whole nuts to the feed hopper while assuring that they are maintained in a clean and sterile condition.

SUMMARY OF THE INVENTION

The above and other objects and advantages of the invention are achieved by the provision of a high production nutcracking apparatus of the described type which includes guide means for delivering at least some of the shell fragments which are produced at the cracking location, and any whole nuts which are mis-fed or fail to be cracked, from the cracking turret and onto an inclined openwork grate. The inclined grate is configured to permit the shell fragments to pass directly therethrough while the whole nuts slide down and drop off a lower end of the grate, to thereby separate the shell fragments from the uncracked whole nuts.

The apparatus of the invention preferably also includes a nut return system for automatically returning to the hopper the uncracked whole nuts which drop from the lower end of the grate. Thus the uncracked whole nuts are returned to the hopper without exposure to possible contamination.

To facilitate the removal and collection of the shell fragments, a chamber is provided which substantially encloses the cracking location, and a vacuum aspiration system is provided to deliver the collected shell fragments to a waste container. To collect those shell fragments which are not collected by the aspiration system described above and which fall through the grate, there is provided a second aspiration system for collecting and delivering those shell fragments to the same or different waste container.

The grate of the present invention preferably comprises a plurality of parallel rods with the rods being laterally aligned in a common plane and laterally spaced apart a predetermined distance which is correlated to the size of the nuts being cracked. Also, the grate is supported only adjacent the upper ends of the rods, so that the rods vibrate by the operation of the machine to thereby assist movement of the whole nuts toward the lower end of the grate.

BRIEF DESCRIPTION OF THE DRAWINGS

Figure 1:
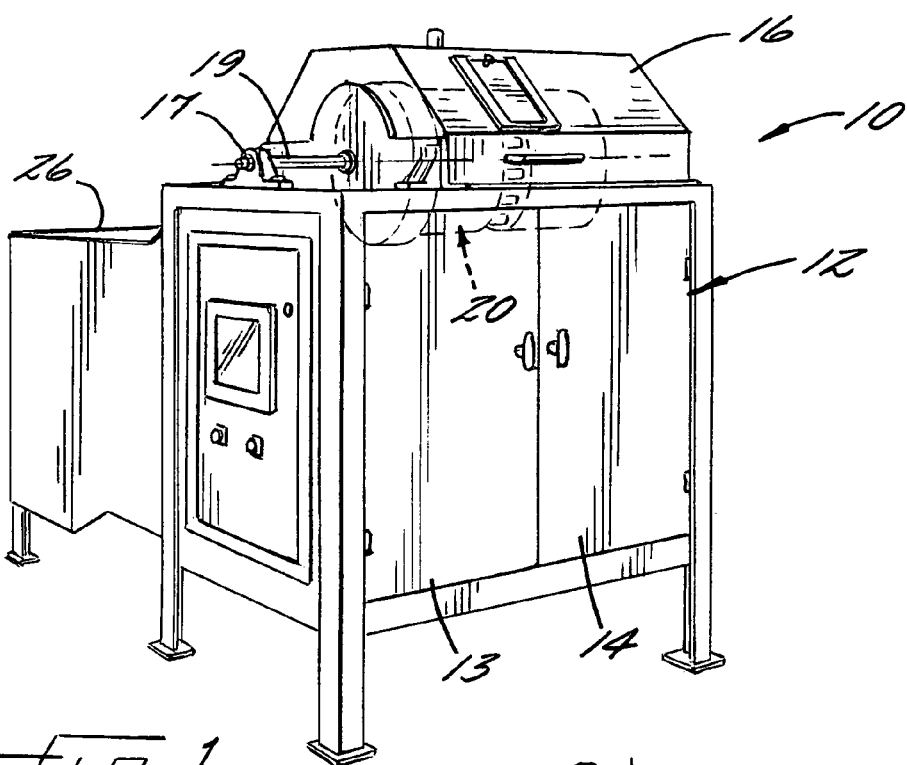
Figure 2:
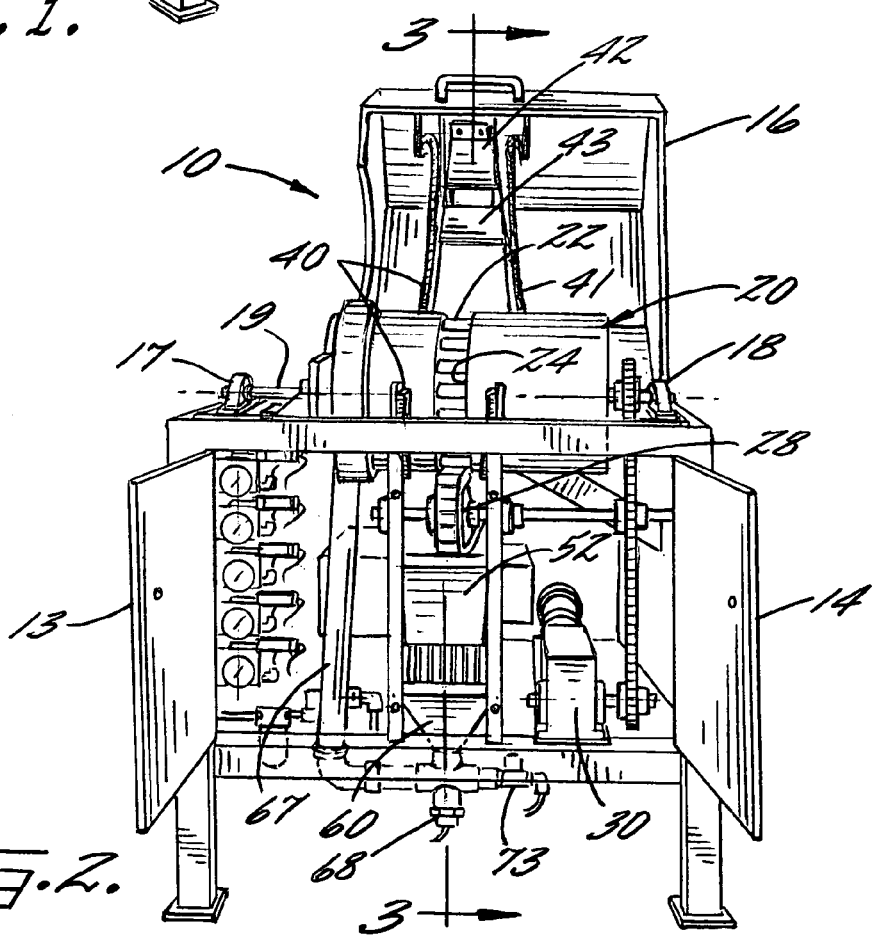

Having thus described the invention in general terms, reference will now be made to the accompanying drawings, which are not necessarily drawn to scale, and wherein:

FIG. 1 is a perspective view of a high production nutcracking apparatus which embodies the features of the present invention;

FIG. 2 is a front elevation view of the apparatus, with the front doors and hood being opened;

FIG. 3 is a sectional side elevation view taken along the line 3—3 of FIG. 2;

FIG. 4 is a sectional front view taken along the line 4—4 of FIG. 3;

FIG. 5 is a perspective view of the nozzle which forms a part of the air ejection system;

FIG. 6 is a top plan view of the grate which forms a part of the system for separating the loose shell fragments from the uncracked whole nuts;

FIG. 7 is a sectional side elevation view which is taken along the line 7—7 of FIG. 4; and FIG. 8 is a fragmentary view of the air aspiration systems of the apparatus.

DETAILED DESCRIPTION OF THE PREFERRED EMBODIMENT

The present invention now will be described more fully hereinafter with reference to the accompanying drawings, in which a preferred, but not necessarily all embodiments of the invention is shown. Indeed, the invention may be embodied in many different forms and should not be construed as limited to the embodiment set forth herein. Rather, the illustrated embodiment is provided so that this disclosure will satisfy applicable legal requirements. Like numbers refer to like elements throughout.

Referring more particularly to the drawings, FIGS. 1–8 illustrate a high production nutcracking apparatus 10 which embodies the features of the present invention. As will become apparent, many of the components of the present apparatus conform to the corresponding components of the apparatus shown and described in the prior U.S. patents which are listed above under the heading Background of the Invention. The disclosures of these prior patents are expressly incorporated herein, and reference may be had to these prior patents for a more detailed description of the common components.

The apparatus comprises a frame which defines a box-like cabinet 12 which includes a pair of front doors 13, 14, and a rear side 15. A hood 16 is pivotally mounted to the top of the cabinet and so as to be pivotable between a closed position (FIGS. 1 and 3) and an open position (FIG. 2). Also, the upper edge of the cabinet 12 supports a pair of bearing blocks 17, 18 which rotatably mount a central shaft 19 which defines a horizontal central axis.

A cracking assembly in the form of a turret 20 is fixedly mounted to the shaft 19 so as to be rotatable with the shaft about the central axis. The turret 20 comprises a plurality of elongate cracking units 22 which are circularly arranged about the shaft and supported by radially disposed plates (not shown). There are sixteen cracking units in the illustrated embodiment and the units extend generally parallel to each other and to the central axis.

The cracking units 22 each define an opening for receiving the nuts, and the openings of the units are aligned with an annular opening 24 in the periphery of the turret as best seen in FIG. 2. The structure and function of the cracking units are otherwise fully disclosed in the prior patents listed above and which are incorporated by reference.

The apparatus of the present invention further includes means for advancing and delivering a plurality of nuts individually in succession along a path of travel to the rotating turret 20. This nut delivering means includes a hopper 26 for storing a relatively large quantity of nuts to be cracked, and which is fixed to the rear side 15 of the cabinet 12. An endless feed conveyor 28 is provided which includes a feed chain which extends through the hopper and conveys the nuts to a delivery point adjacent the bottom dead center position of the turret 20, all as further described in the prior patents which are incorporated by reference.

The turret 20 is rotatably driven by a motor and chain drive 30 (FIGS. 2 and 3) and operates so that each cracking unit 22 picks up a nut from the conveyor 28 at the bottom dead center position of the turret. With continued rotation of the turret, the nut is stressed at about the 11 o'clock position of the turret when viewed as seen in FIG. 3 and with the turret rotating in the counterclockwise direction. Immediately thereafter, the nut is cracked, and the cracked nut falls into a delivery chute 32 which exits on the side of the cabinet, note FIG. 4.

The cracking of the nuts at the cracking location will inherently produce a quantity of loose shell fragments. To collect these loose shell fragments, the present invention incorporates two air aspiration systems which collect and deliver the fragments to a waste container.

The first or upper aspiration system 34 comprises a sealing arrangement which encloses the cracking location so as to form a chamber which substantially encloses the cracking location and which communicates with an exhaust duct 35 connected to the hood 16 of the apparatus. The exhaust duct 35 is in turn connected to a collection chamber 36 and vacuum source 37. The collection chamber includes a conventional cyclone separator 38 for separating the fragments from the airstream, and a rotatable gate 39 which allows passage of the fragments while sealing against the passage of air.

The sealing arrangement comprises a pair of annular brushes 40, 41 which encompass the turret on respective opposite sides of the annular opening 24 which receives the nuts. About one half of each annular brush is mounted to the frame of the cabinet 12, and the other half is mounted to the hood 16, note FIG. 7.

The hood 16 also mounts a pair of flaps 42, 43 which extend substantially between the brushes and ride on the turret so as to partially fall into the opening 24, note FIG. 3. The flaps 42, 43 are positioned so that one flap 42 overlies the turret upstream of the cracking location and the second flap 43 overlies the turret downstream of the slot. The exhaust duct 35 is connected between the flaps.

The flaps and annular brushes obviously are not able to form a perfect seal, but they nevertheless serve to retain a significant portion of the loose shell fragments so that they can be removed through the exhaust duct 35. Those loose shell fragments that are not collected by the first aspiration system 34 fall downwardly through the turret. To collect these fragments, a second or lower aspiration system 45 is provided, which includes a pair of side plates 47, 48 (note FIG. 4) which are parallel to each other and extend vertically on respective opposite sides of the opening 24 and the conveyor 28 to define a downwardly directed guide passage 50 for the falling fragments. The guide passage is also closed by the front doors 13, 14 and the rear side 15 of the cabinet through which the feed conveyor 28 enters and leaves the cabinet 12.

An inclined solid guide plate 52 is positioned to extend between the side plates 47, 48 and rearwardly from the front of the cabinet to about the midportion thereof. Thus the guide plate 52 closes the bottom of the front portion of the guide passage 50.

A collection chute 54 underlies the rear portion of the guide passage 50, and the collection chute 51 extends forwardly from the rear side 15 of the cabinet a distance sufficient to extend somewhat beyond the lower edge of the guide plate 52. Thus the loose shell fragments which are not collected by the first aspiration system 34 fall either directly into the chute 54, or onto the guide plate 52 and then into the chute 54. The chute is connected to an exhaust duct 55, which leads to the collection chamber 36, note FIG. 8.

A grate 56 is positioned between the lower end of the guide plate 52 and the chute, which is configured to allow the shell fragments to freely pass therethrough. As best seen in FIG. 3, the grate extends from a point adjacent the rear side 15 of the cabinet to a point beyond the lower end of the guide plate 52. Also, it is inclined in a direction opposite to the inclination of the guide plate 52.

Any uncracked whole nuts which are mis-fed by the conveyor, or which are dropped or fail to be cracked by the turret, drop downwardly through the guide passage 50 in the cabinet and fall either directly onto the grate 56 or onto the guide plate 52 and then onto the grate 56. Thus both the loose shell fragments and the uncracked whole nuts both fall onto the grate 56, and the grate is configured to separate the whole nuts from the fragments. More particularly, the grate comprises an open-work structure composed of a plurality of parallel rods 58 which extend from an upper end adjacent the rear side 15 of the cabinet to the opposite lower end. The rods 58 are laterally aligned in a common plane and laterally spaced apart a predetermined distance which is correlated to the size of the nuts being cracked. Thus when the shell fragments and whole nuts are delivered onto the grate 56, the fragments fall directly through the grate and into the chute 54, and the whole nuts slide to the lower end of the grate 56 and fall off into a separate chute 60 which is located adjacent the front of the cabinet.

The rods 58 of the grate 56 are interconnected by a single cross bar 61 at the upper end of the grate, and the cross bar is supported in the cabinet so that the grate can be easily removed and replaced with a grate of different lateral spacing so as to function with nuts of a different average size. More particularly, the cross bar 61 is secured between the side plates 47, 48 by releasable locking members 62 as seen in FIG. 6, and the outermost rods 58 are received in sleeves 63 which are secured to the side plates. As a result of this construction and mounting arrangement, the lower end portion of all but the two outermost rods are free to vibrate from the operation of the cracking machine, and this vibration has been found to assist in the sliding movement of the whole nuts toward the lower end of the grate 56 and into the chute 60.

The apparatus of the present invention further comprises a nut return system for receiving the whole nuts which drop from the lower end of the grate 56 into the chute 60, and for delivering the received nuts back into the hopper 26. The nut return system includes the chute 60, and a receptacle 66 located at the bottom of the chute 60, note FIG. 4. A nut return line 67 communicates with one side of the receptacle 66.

The nut return system further includes an air ejection system for ejecting each nut received in the receptacle 66. The air ejection system includes a sensor 68 which is provided in the bottom of the receptacle and which is designed to sense the presence of a nut. The sensor 68 may for example comprise Allen Bradley capacitive proximity sensor. Also, the air ejection system includes a source of pressurized air which is connected to a delivery line 70 which communicates with an air nozzle 72 which is positioned opposite the nut return line 67 so that air injected through the outlet of the nozzle blows across the receptacle and into the nut return line 67. An electronic air valve 73 is positioned in the delivery line 70, and the valve 73 is controlled to cause the valve to open for a predetermined computer controlled time, such as five seconds, in response to a signal from the sensor 68. Thus in operation, the sensor 68 senses whenever a whole nut is received in the receptacle 66, and the valve 73 opens to inject a blast of air from the nozzle and into the receptacle to eject the nut from the receptacle and into and through the nut return line 67.

As will be understood by those skilled in the art, the injected air stream may cause the nut to be drawn toward the outlet of the nozzle 72 by reason of the Bernoulli effect. When this happens, the nut remains in the receptacle and is not ejected into the delivery line 70. To preclude this possibility, a post 75 is mounted in the receptacle, e.g. on the front face of the nozzle 72, to hold the nut at a distance from the outlet of the nozzle and so that the nuts will be consistently ejected from the receptacle.

The nut return line 67 includes a rigid delivery tube 76 which extends into the hopper and which opens at a location which can be below the normal height of the nuts in the hopper.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiment disclosed and that modifications and other embodiments are intended to be included within the scope of the appended claims. Although specific terms are employed herein, they are used in a generic and descriptive sense only and not for purposes of limitation.

What is claimed is:

1. A high production nutcracking apparatus, comprising
   a hopper for storing a relatively large quantity of nuts to be cracked,
   an endless conveyor extending through the hopper for serially delivering the nuts from the hopper to a cracking assembly which cracks the serially delivered nuts at a cracking location,
   guide means for delivering at least some of the shell fragments which are produced at the cracking location of the cracking assembly and any whole nuts which are mis-fed by the conveyor or fail to be cracked by the cracking assembly, from the cracking assembly and onto an inclined grate,
   said inclined grate being configured to permit the shell fragments to pass directly therethrough while the whole nuts slide down and drop off a lower end of the grate, to thereby separate the shell fragments from the uncracked whole nuts, and
   a nut return system for receiving the whole nuts which drop from the lower end of the grate and for returning the received whole nuts back into the hopper,
   whereby the uncracked whole nuts are returned to the hopper without exposure to possible contamination.

2. The apparatus of claim 1 further comprising a first aspiration system which includes a chamber which substantially encloses the cracking location of the cracking assembly for collecting shell fragments and delivering the fragments to a waste container.

3. The apparatus of claim 2 further comprising a second aspiration system for collecting the shell fragments which pass through the grate and delivering the collected fragments to a waste container.

4. The apparatus of claim 3 wherein the first and second aspiration systems comprise a common collection chamber and a common vacuum source.

5. The apparatus of claim 1 wherein the grate comprises a plurality of parallel rods extending from an upper end of the grate to the lower end, with the rods being laterally aligned in a common plane and laterally spaced apart a predetermined distance which is correlated to the size of the nuts being cracked.

6. The apparatus of claim 5 wherein the rods are laterally interconnected adjacent the upper end of the grate, with the majority of the rods being otherwise unsupported so that the majority of the rods are free to be vibrated by the operation of the cracking assembly to thereby assist the movement of the whole nuts toward the lower end of the grate.

7. The apparatus of claim 1 wherein the nut return system comprises a receptacle for receiving the whole nuts, and an air ejection system for ejecting each whole nut which is received in the receptacle through a nut return line which leads to the hopper.

8. The apparatus of claim 7 wherein the air ejection system further comprises a sensor for sensing the presence of a whole nut in the receptacle, and an electronic air valve which opens for a predetermined time in response to a signal from the sensor so that air is blown through the receptacle and into the nut return line.

9. The apparatus of claim 8 wherein the air ejection system includes a nozzle having an outlet which communicates with the interior of the receptacle, and a fixed post mounted in the receptacle adjacent the nozzle outlet for preventing a whole nut from being drawn against the nozzle outlet by the Bernoulli effect.

10. The apparatus of claim 9 wherein the nut return line includes a delivery tube which extends into the hopper and which opens into the hopper at a location adjacent the normal height of the nuts in the hopper.

11. A high production nutcracking apparatus, comprising
a hopper for storing a relatively large quantity of nuts to be cracked,
an endless conveyor extending through the hopper for serially delivering the nuts from the hopper to a cracking assembly which cracks the serially delivered nuts at a cracking location,
said cracking assembly comprising a turret mounted on a machine frame for rotation about a horizontal central axis, with the turret mounting a plurality of cracking units which are uniformly spaced about the periphery of the turret,
said cracking units being configured so that upon rotation of the turret about the central axis, the cracking units each pick up a nut from the endless conveyor at a nut pick up point and convey it to the cracking location where it is cracked,
guide means for delivering at least some of the shell fragments which are produced at the cracking location of the cracking assembly and any whole nuts which are mis-fed by the conveyor or fail to be cracked by the cracking assembly, from the cracking assembly and onto an inclined grate,
said inclined grate being configured to permit the shell fragments to pass directly therethrough while the whole nuts slide down and drop off a lower end of the grate, to thereby separate the shell fragments from the uncracked whole nuts, and
a nut return system for receiving the whole nuts which drop from the lower end of the grate and for returning the received nuts back into the hopper,
whereby the uncracked whole nuts are returned to the hopper without exposure to possible contamination.

12. The apparatus of claim 11 wherein the machine frame defines a box-like cabinet having a front side and an opposite rear side to which the hopper is affixed, and wherein the guide means comprises a pair of parallel side plates disposed vertically in the cabinet on respective opposite sides of the endless conveyor to define a downwardly directed guide passage, and with the inclined grate being disposed in the guide passage adjacent the rear side of the cabinet and so as to extend between the side plates of the guide passage, and wherein the guide means further comprises a guide plate positioned to extend between the side plates and from the front side of the cabinet to about the midportion of the cabinet, and with the guide plate being inclined in a direction opposite to the inclination of the grate and so that whole nuts and shell fragments received on the guide plate fall onto the grate.

13. The apparatus of claim 11 further comprising a sealing arrangement enclosing the cracking location so as to form a chamber which substantially encloses the cracking location and communicates with a first aspiration system, with the sealing arrangement serving to assure that a significant portion of the shell fragments produced at the cracking location will enter the first aspiration system.

14. The apparatus of claim 13 further comprising a second aspiration system for collecting the shell fragments which pass through the grate and delivering the collected fragments to a waste container.

15. The apparatus of claim 14 wherein the sealing arrangement comprises a pair of annular brushes positioned to encircle the turret on respective opposite sides of the cracking location, an upstream flap riding on the turret generally upstream of the cracking location and extending laterally substantially between the annular brushes, and a downstream flap riding on the turret generally downstream of the cracking position and extending laterally substantially between the annular brushes.

16. The apparatus of claim 11 wherein the nut return system comprises a receptacle for receiving the whole nuts, and an air ejection system for ejecting each whole nut which is received in the receptacle through a nut return line which leads to the hopper.

17. The apparatus of claim 16 wherein the nut return system further comprises a sensor for sensing the presence of a whole nut in the receptacle, and wherein the air ejection system includes an electronic air valve which opens for a predetermined time in response to a signal from the sensor so that air is blown through the receptacle and into the nut return line.

18. The apparatus of claim 17 wherein the air injection system includes a nozzle having an outlet which communicates with the interior of the receptacle, and a fixed post mounted in the receptacle adjacent the nozzle outlet for preventing a whole nut from being drawn against the nozzle outlet by the Bernoulli effect.

19. A high production nutcracking apparatus, comprising
a hopper for storing a relatively large quantity of nuts to be cracked,
an endless conveyor extending through the hopper for serially delivering the nuts from the hopper to a cracking assembly which cracks the serially delivered nuts at a cracking location,
guide means for delivering at least some of the shell fragments which are produced at the cracking location of the cracking assembly and any whole nuts which are mis-fed by the conveyor or fail to be cracked by the cracking assembly, from the cracking assembly and onto an inclined grate,
said inclined grate comprising a plurality of parallel rods extending from an upper end of the grate to a lower end, with the rods being laterally aligned in a common plane and laterally spaced apart a predetermined distance which is correlated to the size of the nuts being cracked and so as to permit the shell fragments to pass directly therethrough while the whole nuts slide down and drop off the lower end of the grate, to thereby separate the shell fragments from the uncracked whole nuts.

20. The apparatus of claim 19 wherein the rods are laterally interconnected adjacent the upper end of the grate, with the majority of the rods being otherwise unsupported so that the majority of the rods are free to be vibrated by the operation of the cracking assembly to thereby assist the movement of the whole nuts toward the lower end of the grate.

* * * * *